United States Patent Office 3,242,101
Patented Mar. 22, 1966

3,242,101
NICKEL-MOLYBDENUM-ALUMINA HYDRO-
CARBON CONVERSION CATALYST
Henry Erickson, Park Forest, and Henry D. Ballard, Jr.,
Dolton, Ill., assignors to Sinclair Research Inc., Wilmington, Del., a corporation of Delaware
No Drawing. Filed July 24, 1962, Ser. No. 212,166
6 Claims. (Cl. 252—465)

This invention relates to the catalytic processing of petroleum hydrocarbon stocks which in many cases contain non-hydrocarbon impurities and particularly relates to an improved nickel-molybdenum-alumina hydrocarbon conversion catalyst especially suited for the hydrogen treatment of these hydrocarbon stocks. The catalyst, due to its method of preparation, shows unusually high activity for desulfurization, denitrogenation and hydrogenation of olefins and aromatics of said petroleum hydrocarbons.

The improved catalysts of this invention are prepared by addition to an alumina support of both nickel and molybdenum in each of at least two separate impregnations employing an aqueous medium containing compounds of said metals. After the first impregnation, with the promoting metals, the impregnated, finely divided carrier may be formed into macrosize particles which are calcined at a temperature that is not deleterious to the alumina carrier, for instance up to about 1300° F. or somewhat more. These temperatures may convert the promoting metals to their oxides and in any event the calcination prepares the product for the further manufacturing steps. After each impregnation, the catalyst is calcined at these temperatures, but preferably, if the initially impregnated product is calcined at temperatures of at least about 1150° F., the resulting material, after final reimpregnation with the promoting metals, is calcined at a temperature of about 750 to 1100° F.

The presence of sulfur and nitrogen in hydrocarbon oils has long been recognized as undesirable. Nitrogen compounds have a poisoning effect as they often tend to reduce or destroy the activity of catalysts employed to convert, e.g. crack, these stocks. The higher the nitrogen content of the charge stock, the higher will be the temperature required to effect a given amount of conversion which eventually requires more frequent regeneration or replacement of the catalyst. Sulfur compounds are highly objectionable in hydrocarbon oils as they have an unpleasant odor, tend to cause corrosion and often lead to sludging. These difficulties have led to various proposals for desulfurization and denitrogenation of almost all petroleum stocks which are normally liquid or which can be made fluid at treating temperatures, including light distillates, middle and heavy distillates and even residual stocks. For instance, prior methods have included acid treatment, deasphalting and hydrogenolysis in contact with catalytic material such as molybdenum sulfide, tungsten oxide, nickel sulfide, tungsten sulfide, cobalt molybdate, cobalt tungstate, etc. Hydrogen treatment of the feedstocks has become widely accepted, but as yet it has not been found to effect this hydrogenation selectively without difficulty, since the relatively severe conditions required for a rapid hydrogenation with sulfur insensitive catalysts are prone to lead to destructive hydrogenation and resulting losses in liquid yield.

Catalysts prepared according to the method of the present invention have been found useful for the removal of non-hydrocarbon impurities and for the hydrogenation of unsaturated, i.e. olefinic and aromatic, hydrocarbons from a wide range of petroleum hydrocarbon stocks for the production of chemicals, lubricating oil and fuels. The catalyst of the present invention can be used for treating mineral hydrocarbon stocks comprising base stocks for lubricants, lighter petroleum distillates such as a gas oil for catalytic cracking and hydrocracking, wax distillates from paraffin crudes, catalytically cracked distillates, coal tar distillates and the like. These catalysts have been found effective for the pretreatment of feedstocks for catalytic cracking including reduction in the concentration of sulfur, oxygen and nitrogen compounds, and of components which tend to produce excessive quantities of carbonaceous deposits in catalytic cracking, as well as the hydrogenation of such stocks to improve conversion and selectivity in catalytic cracking.

The alumina base from which the catalyst is prepared can be any of the known hydrates or an activated or calcined hydrogel. Hydrates such as the monohydrate, boehmite; the trihydrates, bayerite I, bayerite II (randomite or nordstrandite) and gibbsite; or another hydrous alumina which appears to be amorphous and preferably the hydrates which contain a major portion or consist essentially of boehmite. Calcination converts these hydrates to an activated or gamma family type alumina, e.g. gamma, delta, eta, chi, etc., depending on the composition of the hydrate and choice of calcination conditions. The alumina hydrate can be prepared by any of the conventional methods, for example, an aqueous solution of aluminum chloride or other acidic aluminum salt can be reacted with aqueous ammonium hydroxide to precipitate an essentially boehmite or amorphous alumina hydrate. This material can be washed to remove chloride and ammonium ions.

The alumina can be activated or a hydrate in the form of dried or undried alumina hydrate or alumina hydrogel in gelatinous form dried sufficiently to afford discrete particles; in any event, finely divided particles, e.g. passing about 100 or even 200 mesh (Tyler) for the most part, such as spray dried microspheres are preferred for our initial impregnation step. Such alumina supports are usually characterized by a large surface area ranging from about 60 to 600 or more square meters per gram, preferably greater than about 200 square meters per gram as determined by the BET method. They may also have a relatively large content of pore volume in the pore size range of about 20 to 100 Angstrom units, of the order of greater than 0.3, preferably greater than 0.6 cc. per gram of pore volume in pores of this size, although the mechanical steps of forming the catalyst into pellets, as by tabletting or extruding, may affect the amount of pore volume of this size. Typical alumina based catalysts made from boehmite alumina may have essentially no pores greater than about 50 Angstrom units in size and have pore distributions which are similar to those of silica-alumina. On the other hand, the catalysts made from aluminas containing high percentages of the crystalline trihydrates in the precursor alumina mixtures have considerable pore volume in the 100 to 1000 Angstrom units pore size range. These large pores do not occur in many alumina bases derived from the boehmite or monohydrate form of precursor alumina, either before or after calcination. The boehmite type of precursor alumina is often characterized by crystallite size of the order of 40 Angstrom units before and after calcination and contains no pores larger than 50 Angstrom units.

In accordance with the present invention, the main constituent of the catalyst is the activated alumina base having deposited thereon minor amounts of catalytically-active molybdenum and nickel. The total amounts of catalytically active components can vary considerably while being sufficient to afford a substantial catalytic effect. In general, the amount of these metal components present is a minor portion of the catalyst and may be as low as about 2 weight percent of the finished catalyst. Usually the total active metal components can comprise from about 2 to 30 weight percent of the catalyst and each component is at least about 1 weight percent of the finished catalyst. The catalyst preferably contains about 2 to 6 or even 10 percent of the nickel component and about 5 to 25 percent of the molybdenum component. All of the percentages pertaining to the amounts of metal components are calculated as weight percent of the finished catalyst on nickel and molybdenum trioxide bases.

The finely divided alumina base, which is to be treated in accordance with the present invention, is first impregnated by the addition of nickel and molybdenum compounds in an aqueous medium to effect deposition on the alumina base of the catalytically-active metal components in amounts of at least about 0.5%, preferably about 1 to 3 or 5% by weight of nickel and at least about 1%, advantageously about 3 to 12%, by weight of the molybdenum component. The time necessary to give this result can depend upon the material being deposited as well as the conditions of agitation and for instance the temperature. The slurry can then be filtered and the product dried. The impregnated material is formed into macrosize, preferably by extrusion to give a catalyst of good porosity. The macrosize particles have diameters of about 1/32 to 1/4", preferably about 1/16", and lengths of about 1/32" or 1/16" up to about 1/2" or more. By performing the first impregnation with finely divided alumina and forming the macrosize particles prior to the second impregnation a most advantageous distribution of metal in the pellets is obtained, i.e., the initial metal is evenly distributed throughout the pellets and the later added metals are concentrated on the pellet surfaces where the primary catalytic effects are expected to take place.

In each of the impregntions the catalytically active metal components are in an aqueous medium either as water-soluble compounds in solution, although an excess of the water-soluble materials may be present to give a slurry, or as relatively water-insoluble compounds in slurry form. Thus, either type of impregnation may be used especially in the initial impregnation but water-soluble compounds are preferred in subsequent impregnations. Thus, in the first impregnation the nickel and molybdenum may be deposited in the form of water-soluble compounds or salts, for example as nickel acetate, bromate, bromide, perchlorate, chloride, formate, nitrate, etc.; molybdenum bromide, oxide (tri- and penta-) oxytetrachloride, ammonium paramolybdate, etc. and which water soluble salts upon calcination for instance, in an atmosphere of hydrogen, nitrogen, free oxygen-containing gas, such as air, or other gas are converted to the oxide form. When employed the substantially water-insoluble compounds of the promoting metals apparently react with or are absorbed on the alumina. Usually mixing of these compounds and the alumina is continued for at least about ten minutes and at a temperature of about 125 to 210° F. Higher or lower temperatures can be employed if desired, for instance room temperature is effective. However, tempeatures above the boiling point of water may necessitate the use of superatmospheric pressures to maintain the liquid phase. The water-insoluble compounds are usually inorganic and in the form of oxides, hydroxides, carbonates, including basic carbonates, and other forms which yield metal oxides upon calcination, see U.S. Patent 2,898,308, hereby incorporated by reference.

The product from the first impregnation is calcined, for instance at temperatures of up to about 1300° F. or more, preferably at a temperature of at least about 1150° F. and often not exceeding 1250° F. In the calcination the temperature will usually be at least about 400° F. and advantageously it is at least 750° F. Also, it is preferred that in the first impregnation that about 25 to 75, advantageously more than about 40 weight percent of the total quantity of molybdenum be deposited in the first impregnation and that about 25 to 75, preferably less than about 50 weight percent of the total nickel be deposited in the first impregnation. The remainder of the catalytically-active metals is deposited in the second and subsequent impregnations, if any, with the amount of nickel and molybdenum added in the second impregnation being in the ranges set forth.

After the product from the first impregnation has been calcined, it is then re-impregnated with both nickel and molybdenum. In the second and subsequent impregnations, if there are more than two, the nickel and molybdenum are preferably deposited in the form of water-soluble compounds or salts, for example as nickel acetate, bromate, bromide, perchlorate, chloride, formate, nitrate, etc.; molybdenum bromide, oxide (tri- and penta-), oxytetrachloride, ammonium paramolybdate, etc. and which water soluble salts upon calcination for instance, in an atmosphere of hydrogen, nitrogen, free oxygen-containing gas, such as air, or other gas are converted to the oxide form. The amounts of metals deposited in the second impregnation are preferably about 25 to 75, advantageously less than about 60 weight percent molybdenum of the total molybdenum, and about 25 to 75, advantageously more than 50 weight percent nickel of the total nickel. The catalyst can be dried as after the first impregnation and is calcined, for instance, at temperatures up to about 1300° F. or more. This calcination is preferably conducted at a temperature up to about 1100° F., especially when the calcination after the first impregnation is conducted at temperatures of at least about 1150° F. Again the calcination is usually conducted at temperatures of at least about 400° F. and advantageously at least about 750° F. More than two impregnation-calcination sequences may be used and in a given impregnation the nickel and molybdenum can be added in separate or a common aqueous medium and the latter is preferred.

Catalysts prepared as above are particularly active when the activating metals in the oxide form are converted to the sulfides. To convert the metal oxides to the sulfides, the metal-activated alumina catalyst in the oxide form as obtained from the calcination step may be sulfided by passing hydrogen sulfide, either pure or diluted with another gas, such as for instance, hydrogen, over the catalyst bed at temperatures usually below about 800° F., preferably at temperatures of about 400 to 600° F., for a time sufficient to convert a significant portion of the oxides of metal components to their respective sulfides. Alternatively, the catalyst may be sulfided by the processing of a sulfur-containing feed.

PREPARATION OF CATALYST

*Catalyst A (7128)*.—A hydrated alumina consisting of boehmite and amorphous hydrous alumina, having a surface area of 550 square meters per gram and a total pore volume of 0.93 cc. per gram was used as a catalyst support. The hydrated alumina had a moisture content of 50%. 1580 g. of the alumina were impregnated with 890 ml. of an ammoniacal solution containing 197.6 $Ni(NO_3)_2 \cdot 6H_2O$, 160 g. $MoO_3$ and $NH_4OH$ to raise the pH to 9.0. This volume was sufficient to wet the alumina with no excess to form a separate liquid phase. The product was dried for 16 hours at 110° C. in a forced draft oven. The dried product was cooled and passed through a 20 mesh screen to break up lumps. Using a Simpson Intensive Mixer, the powder was mixed with 1% soluble starch, 1½% methyl cellulose and sufficient water to form an extrudable mass. The product was extruded to 1/16 inch diameter, using a Welding Engineer's augur-type extruder. The extrudate was dried at 110° C. and broken to about 1/8 inch lengths. The dried extrudate was calcined in a muffle furnace, using a cam-controlled device to provide a 300° F. per hour rise to 900° F., 6 hours holding time at 900° F., a 15 minute rise to 1200° F. and a 2 hour holding time at 1200° F. The product had an apparent bulk density of 0.69 g. per ml., at lateral crushing strength (1/8 in. lengths) of 8.5 lbs. and an analysis, ignited basis, of 3.6% Ni, 13.9% $MoO_3$.

The surface area was 295 square meters per gram and a total pore volume of 0.56 cc. per gram.

*Catalyst B (7133).*—A hydrated alumina consisting of boehmite and amorphous alumina hydrates, having a surface area of 550 square meters per gram and a total pore volume of 0.93 cc. per gram, as measured by nitrogen adsorption (BET) methods, was used as a catalyst support. 16,110 g. of the spray-dried alumina hydrate microspheres passing 200 mesh (Tyler) was impregnated with 9 liters of solution containing 889 g.

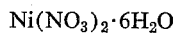

720 g. $MoO_3$ and $NH_4OH$ added to give a pH of 9.0. This volume was sufficient to completely wet the alumina powder without excess to permit a separate liquid phase. The impregnated powder was dried in a forced air oven at 110° C. for 16 hours, cooled and passed through a 20 mesh screen to break up lumps. This powder was mixed with 1 wt. percent soluble starch and 1.5 wt. percent methyl cellulose and water to 41% free moisture (moisture not chemically bound). Mixing was carried out for 20 minutes in a Simpson Intensive Mixer. The product was extruded to 1/16″ diameter using a Welding Engineer's augur-type extruder. The extrudate was dried as above, broken to about 1/8″ lengths and muffle calcined, using a cam-controlled device to provide a 300° F. per hour rise to 900° F., 6 hours holding time at 900° F., 15 minutes time to raise temperature to 1200° F. and 2 hours holding time at 1200° F. The product had an apparent bulk density of 0.63 g./cc., a lateral crushing strength (1/8″ length) of 7.2 lbs. and an analysis, ignited basis, of 1.85% Ni and 8.00% $MoO_3$.

2000 g. of this calcined extrudate were evacuated to about 30 inches Hg vacuum for 20 minutes at room temperature. 3300 ml. of an ammoniacal (pH 9.0) solution containing 484 g. "85% Molybdic Acid" and 530 g.

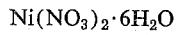

were added. The vacuum was released and the impregnated catalyst was let stand 5 minutes. It was then drained of all excess liquid and dried 16 hours at 110° C. in a forced draft oven. A portion of the dried catalyst was calcined in the same manner as was Catalyst A. The product had an apparent bulk density of 0.70 g./cc., a lateral crushing strength of 7.1 lbs./1/8″ length. Analysis shows 4.48% Ni and 16.8% $MoO_3$.

*Catalyst C (7134).*—The remainder of the 2000 g. portion extrudate re-impregnated with nickel and molybdenum used to prepare Catalyst B, which had not been calcined was heated to provide a 300° F. per hour rise to 900° F., 6 hours holding time at 900° F., to 1050° F. in 30 minutes, 2 hours holding time at 1050° F., cooled and packaged. The product had an apparent bulk density of 0.70 and a lateral crushing strength of 7.2 lbs./1/8″ length.

*Catalyst D.*—Catalyst D is a commercially available alumina supported catalyst containing 2.96% nickel and 14.1% molybdenum trioxide. The apparent bulk density is 0.69 g./cc.

Processing conditions for the desulfurization, denitrogenation and hydrogenation will vary with the feedstock and the degree of purification and/or hydrogenation desired. Generally the temperatures will be in the range of about 400 to 850° F., preferably in the range of about 500 to 750° F.; pressures may range from atmospheric or higher to about 5000 p.s.i.g., preferably about 400 to 2,500 p.s.i.g.. The weight hourly space velocity (weight of feed per weight of catalyst per hour, WHSV) can be in the range of about 0.1 to 20, preferably 0.1 to 10 WHSV. Suitable free hydrogen ratios are from about 100 to 10,000 s.c.f.b. of feed. The catalyst is macrosize and can be used as a fixed bed and the hydrogen treatment can be conducted in either the liquid and/or vapor phase. If desired, the catalyst can be pre-reduced in an atmosphere containing free hydrogen, e.g. at temperatures of about 700 to 1100° F., prior to use in processing the hydrocarbon feed.

The advantages of the previously described method of catalyst preparation, according to the present invention, may be seen from the following examples.

*Example I*

Catalyst samples A, B and C were charged to separate fixed bed reactors and heated to 600° F. in a slow flow of $H_2S$ at atmospheric pressure for about 2 hours. A hydrocarbon feedstock consisting essentially of dinuclear aromatic compounds and used as a diesel reference fuel was processed over these catalysts at about 650° F., 1000 p.s.i.g. with a WHSV of about 5 and a hydrogen rate of about 6,700 s.c.f.b. Analyses of the feed and products from each of the above reaction zones are given in Table I.

TABLE I

|  | Feed | Product | | |
|---|---|---|---|---|
|  |  | Catalyst A | Catalyst B | Catalyst C |
| Liquid, wt. percent yield | 100.0 | 95.4 | 100.3 | 101.6 |
| Analyses: |  |  |  |  |
| Percent Hydrogen | 7.07 | 8.66 | 8.94 | 9.05 |
| Percent Sulfur | 0.90 | 0.12 | 0.08 | 0.13 |
| Percent Nitrogen | 0.26 | 0.14 | 0.13 | 0.12 |
| Percent Naphthalenes | 93.3 | 41.6 | 32.2 | 28.8 |

The data in Table I demonstrate the superiority of Catalyst B, prepared by the method previously described, over Catalyst A, prepared by a single impregnation. Catalyst B gave higher removal of sulfur and nitrogen, and shows higher hydrogenation activity as demonstrated by the higher quantity of hydrogen in the product and the greater reduction in naphthalene concentration. The advantages of the preferred final calcination temperature below 1100° F. are shown by Catalyst C. Although somewhat less active for desulfurization, this catalyst shows outstanding activity for the more difficult task of hydrogenation.

*Example II*

The use of Catalyst C in the pretreatment of a heavy gas oil for catalytic cracking is shown in Table II. Process conditions were: Temperature 675° F., pressure 1000 p.s.i.g., WHSV 1.0 and hydrogen rate 2,500 s.c.f.b. The catalysts were sulfided before use by a method similar to the one used in Example I. Catalyst D, described above, is a commercially available Ni-Mo/$Al_2O_3$ catalyst.

TABLE II

|  | Feed | Product | |
|---|---|---|---|
|  |  | Catalyst C | Catalyst D |
| Liquid yield, wt. percent feed | 100.0 | 99.1 | 98.8 |
| Analyses: |  |  |  |
| Gravity, ° API | 23.4 | 26.5 | 26.1 |
| Percent H | 12.33 | 12.94 | 12.81 |
| Percent S | 1.21 | 0.09 | 0.17 |
| Percent N | 0.18 | 0.11 | 0.12 |
| Carbon Residue, Ramsbottom | 0.295 | 0.102 | 0.125 |

The data in Table II show that Catalyst C prepared by double impregnation and the final calcination conducted in the preferred temperature range is superior to similar catalysts previously known.

*Example III*

Table III shows the results when Catalyst C was used for hydrogenation of methyl-naphthalenes and the pretreatment of a light straight run gas oil to be used as a feed for catalytic hydrocracking. Also, Table III shows the results when Catalyst B was used for the processing of base stock for lubricants. Catalysts B and C were sulfided prior to use.

TABLE III
[Use of Catalyst C in Various Processes]

| Run Conditions: | Hydrogenation of Methylnaphthalenes | | Pretreatment o Hydrocracking Feed | | Processing of Lube Distillate | | | |
|---|---|---|---|---|---|---|---|---|
| Catalyst | C | | C | | B | | B | |
| Temperature, °F | 550 | | 725 | | 700 | | 700 | |
| Pressure, p.s.i.g | 1,000 | | 1,500 | | 1,500 | | 1,500 | |
| WHSV | 2.0 | | 1.2 | | 1.0 | | 1.0 | |
| Hydrogen Rate | a 7/1 | | b 2,500 | | b 1,500 | | b 1,500 | |
| | Feed | Product | Feed | Product | Feed | Product | Feed | Product |
| Liquid yield, wt. percent feed | | 99.8 | | | | | | |
| Analyses: | | | | | | | | |
| Gravity, °API | 7.7 | 16.1 | 36.3 | 39.3 | 17.9 | 21.0 | 16.5 | 21.0 |
| Percent H | 7.08 | 9.83 | 13.45 | 14.00 | 11.97 | 12.46 | 11.29 | 12.02 |
| Percent S | 0.375 | 0.10 | 0.255 | .001 | 0.26 | 0.017 | 0.99 | 0.098 |
| N, p.p.m | 500 | 20 | 143 | 1 | 500 | 90 | 1,800 | 600 |
| 1-methylnaphthalene | 58.2 | 1.6 | | | | | | |
| 2-methylnaphthalene | 41.8 | 0.9 | | | | | | |
| Methyl tetralins | | 90.5 | | | | | | |
| Methyl decalins | | 5.2 | | | | | | |
| Unknown | | 1.8 | | | | | | |
| ASTM Color | | | | | Dark | 1.5 | Dark | 2.0 |
| Specific Dispersion | | | | | | 123.1 | | 150.8 | 146.6 | a Mols/mol of hydrocarbon feed.
b S.c.f./bbl.

It is claimed:

1. A method for preparing a catalyst consisting essentially of 1 to 10 weight percent nickel and about 5 to 25 weight percent molybdenum calculated as molybdenum trioxide, on an alumina support by the steps comprising impregnating finely divided alumina by addition of nickel and molybdenum compounds in an aqueous medium sufficient to effect deposition on said alumina of at least about 0.5 weight percent nickel and at least about 1 weight percent molybdenum, calculated as molybdenum trioxide, forming the impregnated alumina into macrosize particles, calcining said impregnated and formed alumina support at a temperature of about 1150 to 1300° F., impregnating said previously impregnated and calcined alumina by the addition of nickel and molybdenum compounds in an aqueous medium sufficient to effect deposition on said alumina support of at least about 0.5 weight percent nickel and at least about 1 weight percent molybdenum calculated as molybdenum trioxide and calcining the impregnated support at a temperature of about 750 to 1100° F.

2. The method of claim 1 in which the catalyst is formed into macrosize particles by extrusion.

3. The method of claim 1 in which in both impregnations both the nickel and molybdenum are in the same aqueous solution when added to the alumina and more than 40 to about 75 weight percent of the molybdenum and about 25 to less than 50 weight percent of the nickel are deposited in the first impregnation and about 25 to less than 60 weight percent of the molybdenum and more than 50 to about 75 weight percent of the nickel are deposited in the second impregnation.

4. The catalyst prepared in accordance with claim 1.
5. The catalyst prepared in accordance with claim 3.
6. The catalyst prepared in accordance with claim 4.

References Cited by the Examiner
UNITED STATES PATENTS 2,905,636  9/1959  Watkins et al. _____ 208—216
3,114,701  12/1963  Jacobson et al. _____ 208—254

DELBERT E. GANTZ, *Primary Examiner.*
ALPHONSO D. SULLIVAN, *Examiner.*